Sept. 3, 1968
K. L. ZIEGLER
3,400,304
CURRENT REVERSING CIRCUIT
Filed Feb. 25, 1966
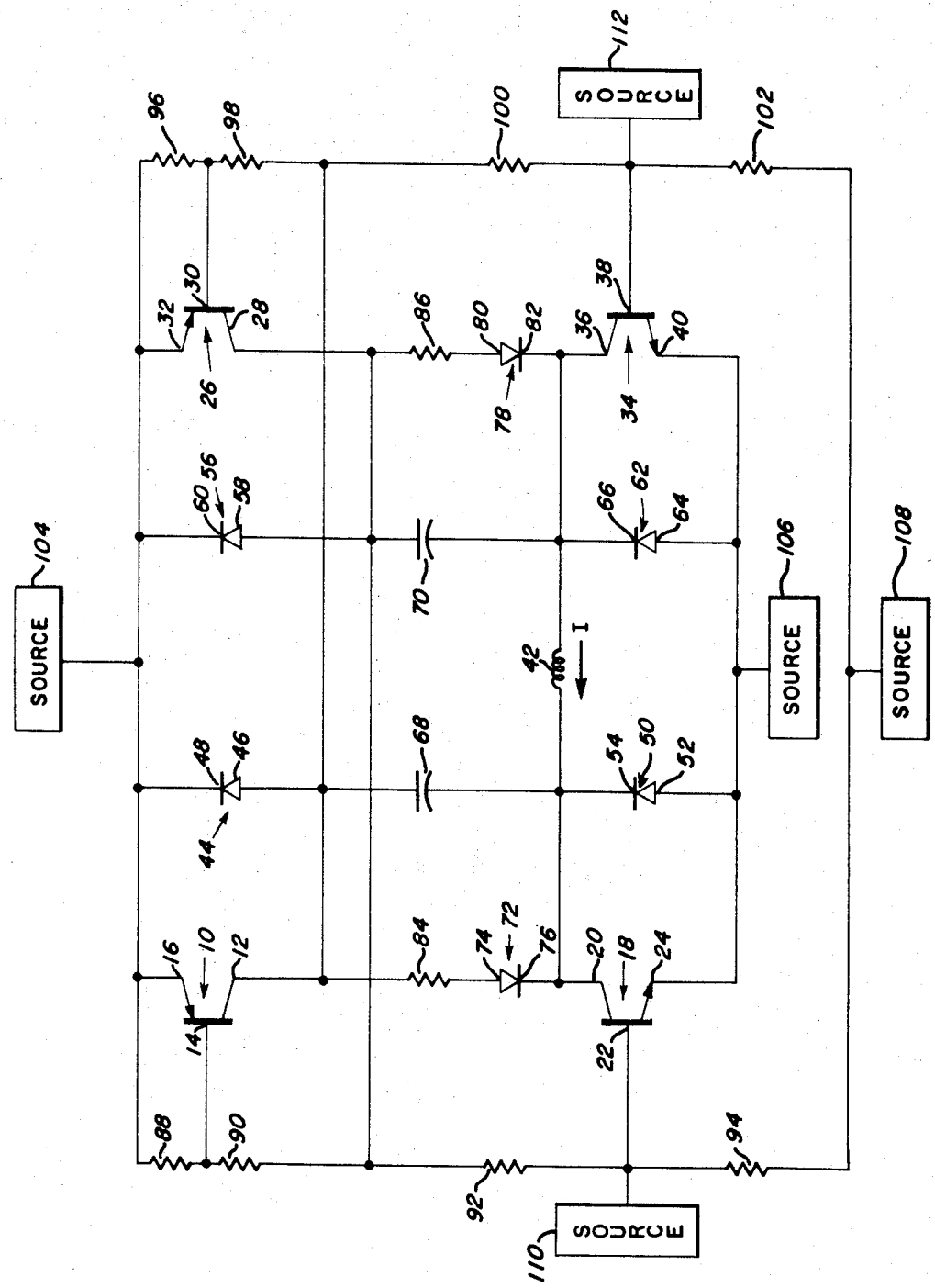
INVENTOR
KENNETH L. ZIEGLER
BY Carole M. Calman
ATTORNEY

United States Patent Office 3,400,304
Patented Sept. 3, 1968

3,400,304
CURRENT REVERSING CIRCUIT
Kenneth L. Ziegler, Stow, Mass., assignor to Raytheon Company, Lexington, Mass., a corporation of Delaware
Filed Feb. 25, 1966, Ser. No. 530,048
9 Claims. (Cl. 317—148.5)

This invention is concerned with electronic circuits and, more particularly, with circuits for changing the direction of current flow in an inductive load.

It is often necessary to reverse the direction of current flow in an inductive load, where the transmission time is quite short in comparison to a variable dwell time. Hitherto, current reversing circuits have first dissipated the energy stored in the inductive load and then re-established the current flow in the desired direction. Consequently, large amounts of power are wasted, which is especially disadvantageous when high switching rates are required.

In the present invention, the energy stored in the inductive load is temporarily removed and stored elsewhere during the transition time. Then it is replaced in the inductive load with little energy loss. A preferred embodiment of the invention comprises four switches connected to the inductive load and a separate capacitor connected at each end terminal of this load. The switches are selectively operated during the transition time so that the inductive load and one of the capacitors resonate and then are caused to stop resonating when the current through the inductive load is in the reverse direction. Hence, this capacitor is caused to store the energy from the load and then to transfer it back to the inductive load. Thus, the direction of load current flow is reversed and maintained in that direction with little energy loss.

Other objects, features, and embodiments of the invention will become apparent from the following description taken in conjunction with the accompanying drawing, in which:

The sole figure is a diagrammatic representation of a preferred embodiment of the current reversing circuit of the invention.

The sole figure depicts a novel switching circuit for changing the direction of current flow in inductive load 42, comprising PNP transistor 10 having a collector 12, base 14, and emitter 16; NPN transistor 18 having a collector 20, base 22, and emitter 24; diode 72 having an anode 74 and cathode 76 connected to collector 20; resistor 84 connected between emitter 12 and anode 74; PNP transistor 26 having a collector 28, base 30, and emitter 32; NPN transistor 34 having a collector 36, base 38, and emitter 40; diode 78 having an anode 80 and a cathode 82 connected to collector 36; resistor 86 connected between collector 28 and anode 80; positive reference potential source 104 connected to emitters 16 and 32; ground reference potential source 106 connected to emitters 24 and 40; negative reference potential source 108; diode 44 having an anode 46 and a cathode 48 connected to source 104; diode 50 having an anode 52 connected to source 106 and cathode 54; capacitor 58 connected between anode 46 and cathode 54; diode 56 having an anode 58 and cathode 60 connected to source 104; diode 62 having an anode 64 connected to source 106 and a cathode 66; capacitor 70 connected between anode 58 and cathode 66; resistor 88 connected between source 104 and resistor 90; resistor 94 connected between resistor 92 and source 108; a first control source 110 commonly connected to resistors 92 and 94 and base 22; a second control source commonly connected to resistors 100 and 102 and base 38; resistor 96 connected between source 104 and resistor 98 which is further connected to resistor 100; resistor 102 connected between resistor 100 and source 108; and, load inductor 42 connected between collector 20 of transistor 18 and collector 36 of transistor 34.

Thus the circuit of the sole figure utilizes semiconductor devices requiring low transitional voltages and is self-controlled except for the control information received from either source 110 or source 112. Transistor 10 and diode 44, transistor 18 and diode 50, transistor 26 and diode 56, and transistor 34 and diode 62 comprise four switches. Diode 72 isolates transistor 10 from the comparatively high voltage which is developed across transistor 18 during switching. Similarly, diode 78 isolates transistor 26 from the high voltage produced across transistor 34 during its switching operation. Resistors 84 and 86 are included in the circuit for current control in the stable states and may be temperature compensated using any one of the well-known techniques if the inductive load 42 requires it.

Briefly, the circuit of the sole figure operates in the following manner. Transistors 18 and 26 initially are ON, while transistors 10 and 34 are OFF. Current I flows through the load inductor 42 in the direction shown. At a later time, $t_0$, control source 110 applies a signal to base 22 of transistor 18, causing it to turn OFF; thereupon, inductor 42 and capacitor 68 resonate and current I begins to decrease. Subsequently, transistor 26 turns OFF, transistor 34 turns ON, and current I changes its direction. Transistor 10 turns ON next, maintaining the current I in the reverse direction by interrupting the resonance cycle. Hence the energy stored at first in inductor 42 is temporarily transferred to capacitor 68 and then is completely returned to inductor 42 when the resonance cycle is interrupted. The circuit operates in a similar manner to again change the direction of current I when base 38 receives a signal from control source 112.

In more detail, transistors 26 and 18 are initially ON. At this time, transistor 18 is held ON by the current flow from positive voltage source 104, through ON transistor 26 and resistor 92, while transistor 26 is held ON by the current flow from positive voltage source 104, through resistors 96, 98, 84, diode 72, and ON transistor 18. Consequently, current I flows through transistors 26 and 18 and inductive load 42 in the direction shown and has a magnitude substantially determined by the voltage produced by source 104 divided by resistor 86. Furthermore, transistor 10 is in the OFF condition, being held in this condition by resistor 90 connected to ON transistor 26. Similarly, transistor 34 is kept in the OFF state by resistor 100 connected to the series combination of resistor 84, diode 72, and ON transistor 18. Capacitor 68 charges to a value substantially equal to the base current of transistor 26 times resistor 84 which is comparatively small; whereas capacitor 70 charges to a value substantially equal to the current I through inductor 42 times resistor 86 or approximately the voltage generated by source 104.

At some later time $t_0$, source 110 applies a signal to base 22 of transistor 18, causing it to turn OFF. The voltage at collector 20 of transistor 18 rises to approximately the voltage produced by source 104 as diode 44 conducts. Loan inductor 42 and capacitor 68 begin to resonate. Transistor 26 then turns OFF because resistor 98 is connected to conducting diode 44. Also, diode 62 starts conducting. Transistor 34 turns ON since resistor 100 is connected to conducting diode 44, and the resonating continues. Then transistor 10 also switches ON because resistor 90 is connected to the series combination of resistor 86, diode 78, and ON transistor 34. Additionally, transistor 18 is maintained in the OFF state since resistor 92 is connected to the series combination of resistor 86, diode 78, and ON transistor 34. The resonate charging path is through diode 62, inductor 42, capacitor 68, diode 44, and source 104. When transistor 34 turns ON, however, the resonating ceases and the load current path is now through ON transistor 10, capacitor 68, inductor 42, and ON transistor 34. The voltage on collector 20 of transistor 18 is approximately that generated by source 104. Diode 72 conducts, and the current flow through inductive load 42 is maintained in the opposite direction to that shown in the figure, without any significant energy loss in accomplishing this current reversal. This is so because the energy initially stored in inductive load 42 is transferred to capacitor 68 approximately midway through the switching period P and is then fully transferred back to inductor 42 at the end of this period. The length of the switching period P is equal to $$\pi\sqrt{\text{inductor } 42 \times \text{capacitor } 68}$$

During this period, current I changes from substantially a maximum in its initial direction, to zero approximately midway through the period, to substantially a maximum in its reverse direction, at which time the resonance cycle is interrupted. Thereafter, current I is maintained in this reverse direction.

At some later time, it may be desirable to restore the circuit to its initial conditions. In order to accomplish this, the circuit of the figure operates in a manner similar to that just described for reversing the direction of load current because of its inherent symmetry. Transistors 10 and 34 are now ON, and transistors 18 and 26 are OFF. Hence, control source 112 applies a signal to base 38 of transistor 34, causing it to turn OFF, and load inductor 42 and capacitor 70 resonate. Transistor 10 next turns OFF, transistor 18 switches ON, and current I returns to its initial direction. After this operation, transistor 26 turns ON interrupting the resonance cycle, and the current flow through inductive load 42 is maintained in the direction shown in the figure.

The following values have been found to be suitable for the circuit disclosed herein:

| | | |
|---|---|---|
| Inductor 42 | h | $50 \times 10^{-3}$ |
| Current I | a | 4 |
| Switching period P | sec | $1.5 \times 10^{-3}$ |
| Capacitors 68, 70 | µf | 4.5 |
| Transistors 10, 18, 26, 34 | | 10 a., 500 v. |

Although this invention has been described with reference to a preferred embodiment thereof, it should be appreciated that it is not limited thereto. For instance, other means could be utilized for changing the states of the switches for causing the resonating action and its interruption, and, in addition, other switches could readily be used. Accordingly, the invention embraces the full scope of the following claims.

What is claimed is:

1. A circuit for changing the direction of current flow in an inductive load having first and second terminals, comprising:
   a first capacitor connected to said first inductive load terminal;
   a second capacitor connected to said second inductive load terminal; and,
   first means connected to said inductive load for causing one of said capacitors and said inductive load to resonate and for causing said one capacitor and said inductive load to stop resonating to produce and maintain a reverse current flow in said inductive load.

2. The invention according to claim 1 and wherein said first means comprises:
   first and second switching means each connected to said first inductive load terminal; and,
   third and fourth switching means each connected to said second inductive load terminal.

3. The invention according to claim 1 and wherein said first means comprises:
   first and second switching means each connected to said first inductive load terminal;
   third and fourth switching means each connected to said second inductive load terminal; and,
   second means connected to said switching means for preventing said second and third switching means from conducting and for causing said first and fourth switching means to conduct.

4. The invention according to claim 1 and wherein said first means comprises:
   first and second switching means each connected to said first inductive load terminal;
   third and fourth switching means each connected to said second inductive load terminal; and,
   second means connected to said switching means including a source of control signals connected to said second switching means for sequentially preventing said second switching means from conducting, preventing said third switching means from conducting, causing said first switching means to conduct, and causing said fourth switching means to conduct.

5. The invention according to claim 1 and wherein said first means comprises:
   first and second sources of reference potential;
   first, second, third, and fourth transistor switching means, each having first, second, and third electrodes;
   said first reference potential source being connected to the first electrode of said first and third transistor switching means;
   said second reference potential source being connected to the first electrode of said second and fourth transistor switching means;
   said first inductive load terminal being connected to the second electrode of said first and second transistor switching means;
   said second inductive load terminal being connected to the second electrode of said third and fourth transistor switching means;
   signal conducting means connected to the third electrode of each of said transistor switching means; and,
   a source of control signals connected to said signal conducting means connected to said second transistor switching means for changing the state of said second transistor switching means.

6. The invention according to claim 1 and wherein said first means comprises:
   first and second sources of reference potential;
   first, second, third, and fourth transistor switching means, each having first, second, and third electrodes;
   said first reference potential source being connected to the first electrode of said first and third transistor switching means;
   said second reference potential source being connected to the first electrode of said second and fourth transistor switching means;
   first unidirectional current conducting means connected between the second electrodes of said first and second transistor switching means;
   second unidirectional current conducting means connected between the second electrodes of said third and fourth transistor switching means;
   signal conducting means connected to the third electrode of each of said transistor switching means; and,
   a source of control signals connected to said signal conducting means connected to said second transistor switching means for changing the state of said second transistor switching means.

7. The invention according to claim 1 and wherein said first means comprises:
   first and second sources of reference potential;
   first, second, third, and fourth transistor switching means, each having first, second, and third electrodes;

said first reference potential source being connected to the first electrode of said first and third transistor switching means;

said second reference potential source being connected to the first electrode of said second and fourth transistor switching means;

said first inductive load terminal being connected to the second electrode of said first and second transistor switching means;

said second inductive load terminal being connected to the second electrode of said third and fourth transistor switching means;

signal conducting means connected to the third electrode of each of said transistor switching means;

a first source of control signals connected to said signal conducting means connected to said second transistor switching means for changing the state of said second transistor switching means; and, a second source of control signals connected to said signal conducting means connected to said fourth transistor switching means for changing the state of said fourth transistor switching means.

8. The invention according to claim 1 and wherein said first means comprises:

first and second sources of reference potential;

first, second, third, and fourth transistor switching means, each having first, second, and third electrodes and operative in either of two stable states;

said first reference potential source being connected to the first electrode of said first and third transistor switching means;

said second reference potential source being connected to the first electrode of said second and fourth transistor switching means;

said first inductive load terminal being connected to the second electrode of said first and second transistor switching means, said second inductive load terminal being connected to the second electrode of said third and fourth transistor switching means;

signal conducting means connected to the third electrode of each of said transistor switching means;

a first source of control signals connected to said signal conducting means connected to said second transistor switching means for causing said second transistor switching means to turn OFF, said third transistor switching means to turn OFF, said first transistor switching means to turn ON, and said fourth transistor switching means to turn ON; and a second source of control signals connected to said signal conducting means connected to said fourth transistor switching means for causing said fourth transistor switching means to turn OFF, said first transistor switching means to turn OFF, said third transistor switching means to turn ON, and said second transistor switching means to turn ON.

9. The invention according to claim 1 and wherein said first means comprises:

first and second sources of reference potential;

first, second, third, and fourth transistor switching means, each having first, second, and third electrodes and operative in either of two stable states;

said first reference potential source being connected to the first electrode of said first and third transistor switching means;

said second reference potential source being connected to the first electrode of said second and fourth transistor switching means;

first diode means connected between the second electrodes of said first and second transistor switching means for isolating said first and second transistor switching means;

second diode means connected between the second electrodes of said third and fourth transistor switching means for isolating said third and fourth transistor switching means;

signal conducting means connected to the third electrode of each of said transistor switching means;

a first source of control signals connected to said signal conducting means connected to said second transistor switching means for causing, in sequence, said second transistor switching means to turn OFF, said third transistor switching means to turn OFF, said first transistor switching means to turn ON, and said fourth transistor switching means to turn ON; and, a second source of control signals connected to said signal conducting means connected to said fourth transistor switching means for causing, in sequence, said fourth transistor switching means to turn OFF, said first transistor switching means to turn OFF, said third transistor switching means to turn ON, and said second transistor switching means to turn ON.

References Cited

UNITED STATES PATENTS

| | | | |
|---|---|---|---|
| 3,293,505 | 12/1966 | Miller | 317—148.5 |
| 3,235,775 | 2/1966 | Winston | 317—148.5 |
| 2,900,215 | 8/1959 | Schoen | 346—74 |
| 2,838,675 | 6/1958 | Wanlass | 250—36 |

LEE T. HIX, *Primary Examiner.*

J. A. SILVERMAN, *Assistant Examiner.*